United States Patent
Rakshit

(10) Patent No.: US 12,246,834 B2
(45) Date of Patent: Mar. 11, 2025

(54) ELIMINATION OF AIR FLOW INTERFERENCE FOR MID-AIR PACKAGE TRANSFERS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 17/195,943

(22) Filed: Mar. 9, 2021

(65) Prior Publication Data
US 2022/0289380 A1 Sep. 15, 2022

(51) Int. Cl.
*B64D 1/00* (2006.01)
*B64U 10/16* (2023.01)
(Continued)

(52) U.S. Cl.
CPC ............. *B64D 1/00* (2013.01); *B64U 30/293* (2023.01); *B64U 10/16* (2023.01); *B64U 2101/64* (2023.01); *B64U 2201/102* (2023.01)

(58) Field of Classification Search
CPC ....... B64D 1/00; B64C 39/024; B64C 1/0009; B64C 1/063; B64C 1/068; B64C 1/069; B64C 27/08; B64C 27/10; B64C 27/20; B64C 39/003; B64C 39/005; B64C 39/006; B64C 39/008; B64C 39/02; B64U 60/70;
(Continued)

(56) References Cited

U.S. PATENT DOCUMENTS

2016/0376014 A1 * 12/2016 Alnafisah ............... B64U 10/16
244/39
2018/0086460 A1 * 3/2018 Beaman ................. B64U 30/20
(Continued)

FOREIGN PATENT DOCUMENTS

| CN | 208102337 U | * 11/2018 |
| CN | 107364578 A | 1/2019 |
| CN | 107933938 B | 12/2019 |

OTHER PUBLICATIONS

CN_208102337_machine_translation (Year: 2018).*
(Continued)

*Primary Examiner* — Anne Marie Antonucci
*Assistant Examiner* — Patrick M Brady
(74) *Attorney, Agent, or Firm* — Aaron N. Pontikos

(57) ABSTRACT

A method for stabilizing drones performing a mid-air package transfer. One or more processors detecting the proximity of a second drone to a first drone. Interference of air pressure between rotors of the first drone and rotors of the second drone is detected by data from sensors included on the first and second drone. Positions of the rotors of the first drone are adjusted by moving rotor arms in a first direction and the rotors of the second drone are adjusted by moving rotor arms of the second drone in a second direction that increases separation between the rotors of the first drone and the second drone, and the amount of separation is based on reduced interference of air pressure between rotors of the first and second drone. Responsive to determining completion of a package transfer, the positions of the rotors are adjusted to original positions.

20 Claims, 6 Drawing Sheets

(51) Int. Cl.
*B64U 30/293* (2023.01)
*B64U 101/64* (2023.01)

(58) Field of Classification Search
CPC ........ B64U 80/86; B64U 80/00; B64U 10/13; B64U 2201/102; B64U 2101/60; B64U 2101/00; B64U 2101/61; B64U 2101/64; B64U 2101/66; B64U 2101/67; B64U 2101/69

See application file for complete search history.

(56) References Cited

U.S. PATENT DOCUMENTS

| | | | |
|---|---|---|---|
| 2018/0186448 A1* | 7/2018 | Pantalone | B64C 27/08 |
| 2019/0023397 A1 | 1/2019 | Gang | |
| 2019/0035288 A1* | 1/2019 | Beltman | H04R 3/00 |
| 2019/0047698 A1 | 2/2019 | Jassowski | |
| 2019/0088098 A1* | 3/2019 | Gangumalla | G01L 27/005 |
| 2019/0100307 A1* | 4/2019 | Beltman | G05D 1/104 |
| 2021/0031913 A1* | 2/2021 | Martel | B64D 17/80 |
| 2021/0214075 A1* | 7/2021 | Yamato | B64U 10/14 |

OTHER PUBLICATIONS

Hsu, "An IBM Patent on Midair Handoffs for Delivery Drones", Discover, Lovesick Cyborg, May 6, 2017, 4 pps., <https://www.discovermagazine.com/technology/an-ibm-patent-on-midair-handoffs-for-delivery-drones>.

* cited by examiner

ELIMINATION OF AIR FLOW INTERFERENCE FOR MID-AIR PACKAGE TRANSFERS

FIELD OF THE INVENTION

The present invention relates generally to the field of unmanned package delivery and more particularly to the elimination of airflow interference during mid-air package transfer of unmanned airborne delivery vehicles.

BACKGROUND OF THE INVENTION

A flight drone is a remotely controlled or autonomous aircraft without a pilot on board and is sometimes referred to as an unmanned aircraft system. Drones can be configured with hollow centers enabling the carrying of packages for delivery. In some cases, the delivery may require a mid-air handoff of a package from a first drone to a second drone, such as due to low power of the first drone or transfer of a package to extend the delivery range.

Flight drones, often referred to simply as "drones", achieve lift and propulsion from a set of rotors powered by onboard energy supply and by manipulation of rotor speed and in some cases rotor angle. Drone rotors work by producing a high-speed rotation of horizontally mounted propellers, which create a low-pressure condition above the rotors and a higher air pressure condition below the rotors.

SUMMARY

Embodiments of the present invention disclose a method, computer program product, and system. The embodiments include a method for stabilizing a pair of drones performing a mid-air package transfer. The method provides for one or more processors detecting a near proximity of a second drone to a first drone. The one or more processors detecting interference of air pressure between rotors of the first drone and rotors of the second drone, based on air pressure sensors included on the first drone and the second drone. The one or more processors adjusting positions of the rotors of the first drone, by moving an arm attached to respective rotors of the first drone in a first direction. The one or more processors adjusting positions of the rotors of the second drone by moving an arm attached to respective rotors of the second drone in a second direction, wherein the second direction increases separation between the rotors of the first drone and corresponding rotors of the second drone, and wherein an amount of separation is based on detection of reduced interference of air pressure between rotors of the first drone and the corresponding rotors of the second drone, and responsive to determining a completion of a package transfer, the one or more processors adjusting the positions of the rotors of the first drone and the positions of the rotors of the second drone to original positions.

DETAILED DESCRIPTION

Embodiments of the present invention recognize that advancements in alternative methods of delivery continues to be developed and implemented, such as the use of unmanned vehicles to deliver documents, articles, and other packages of manageable size and weight. Embodiments also recognize that the use of airborne drones, often referred to as just "drones," for package delivery can provide an alternative delivery method to manned motorized package delivery. Embodiments further recognize that drone delivery range can be extended by practicing mid-air package transfers between drone vehicles configured respectively to extend and receive a package without requiring intervention or landing.

Embodiments of the present invention recognize that vertical alignment and proximity navigation of drones are compromised by the air pressure interference caused by the alignment of drone rotors during mid-air package transfer. The air pressure interference is caused by the windflaw from the rotors of the top-positioned drones directly aligned over the rotors of the lower-positioned drone, which is a result of proximity and proper alignment to successfully transfer packages between drones. Embodiments recognize that a specific alignment position of the drones is what enables package transfer from one drone to another drone vertically aligned. Air pressure interference can result in instability, altitude loss, and cause difficult or unsuccessful package transfer.

Embodiments of the present invention provide a method, computer program product, and computer system for stabilizing mid-air package exchange between a pair of drones in mid-air flight by reducing air pressure interference between drone rotors, based on adjusting the extension, retraction, or horizontal-plane positioning of drone rotors. The adjustments distance the rotors from each other, which reduces air pressure interference and enables stable close-alignment of the drones for successful package transfer.

Figure 1:
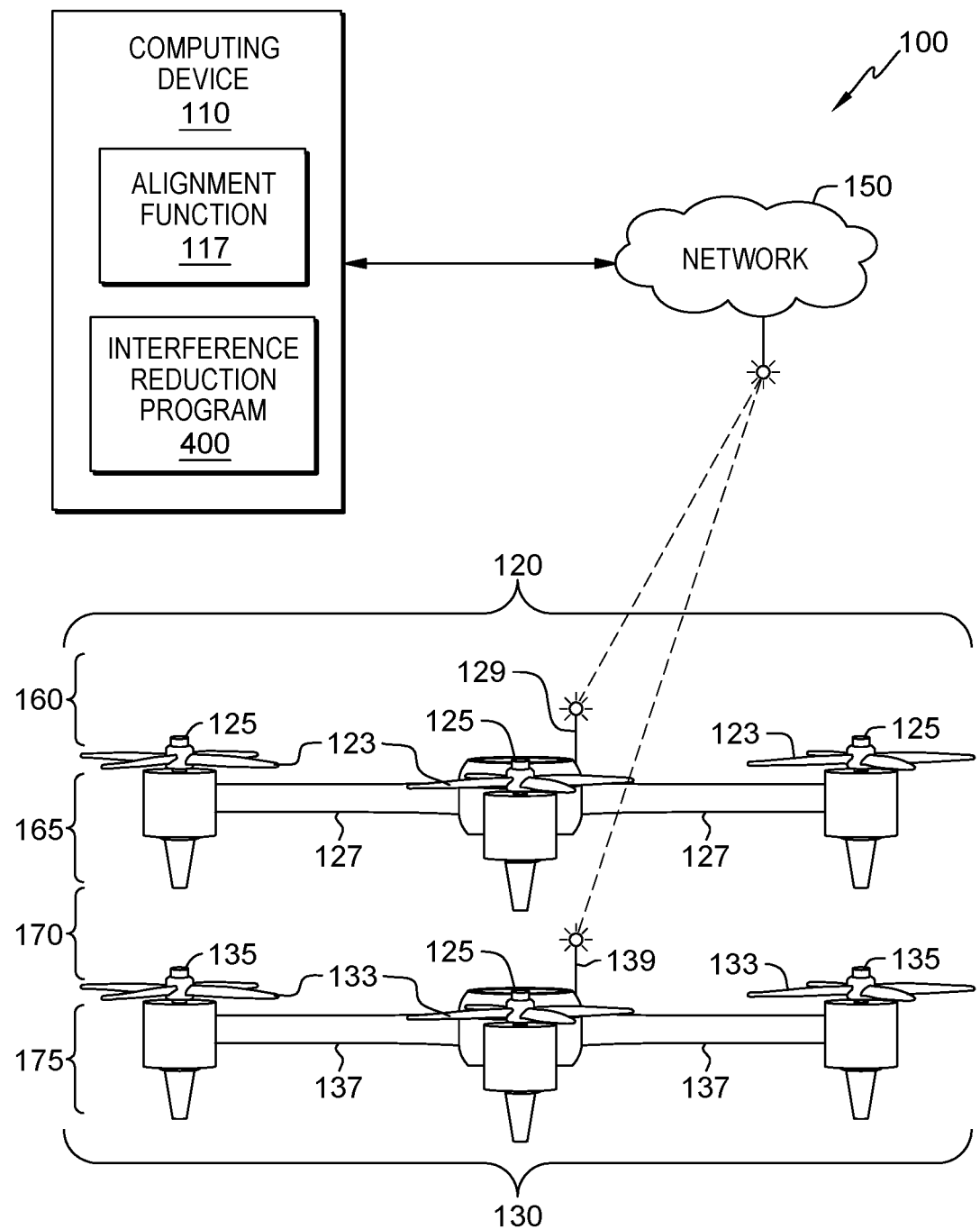
FIG. 1 is a functional block diagram illustrating a distributed network mid-air transfer environment, in accordance with an embodiment of the present invention.

The present invention will now be described in detail with reference to the Figures. FIG. 1 is a functional block diagram illustrating a distributed network mid-air transfer environment, in accordance with an embodiment of the present invention, generally designated 100, in accordance with an embodiment of the present invention. FIG. 1 provides only an illustration of one implementation and does not imply any limitations concerning the environments in which different embodiments may be implemented. Many modifications to the depicted environment may be made by those skilled in the art without departing from the scope of the invention as recited by the claims.

Distributed network mid-air transfer environment 100 includes computing device 110 first drone 120 and second drone 130, all interconnected via network 150, with first drone 120 and second drone 130 connected wirelessly to network 150 via communication antennae 129. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communications between computing device 110, first drone 120, and second drone 130, in accordance with embodiments of the present invention.

Computing device 110 is capable of performing programmable operations and communicating with first drone 120, second drone 130, and other devices of distributed network mid-air transfer environment 100 (not shown). Computing device 110 includes alignment function 117 and interference reduction program 400. In some embodiments, computing device 110 is remotely located and communicates with first drone 120 via network 150, and performs control and operational functions associated with first drone 120, including communications with second drone 130 via wireless network connection with network 150. In other embodiments, computing device 110 is an integral component of first drone 120 (not shown) and performs autonomous functions based on programming instructions, received sensor data, such as global positioning system (GPS) data (not shown), and may receive controlling instruction from remote control sources. In embodiments of the present invention, computing device 110 provides remote controlling instruction communication to both first drone 120 and second drone 130 via network 150. In other embodiments, both first drone 120 and second drone 130 include computerized control from a respective integral or remotely communicating computing device, that includes alignment function 117 and interference reduction program 400 as depicted in computing device 110.

In some embodiments, computing device 110 may be a server computer, a laptop computer, a tablet computer, a smartphone, a smartwatch, or any programmable electronic mobile device capable of communicating with various components and devices within distributed data processing environment 100, via network 150. In another embodiment, computing device 110 represents a computing system utilizing clustered computers and components (e.g., database server computers, application server computers, etc.) that act as a single pool of seamless resources when accessed within distributed network mid-air transfer environment 100. In general, computing device 110 represents one or more programmable electronic devices or a combination of programmable electronic devices capable of executing machine-readable program instructions and communicating with first drone 120 and second drone 130, via network 150. Computing device 110 may include internal and external hardware components, depicted in more detail in FIG. 4.

Alignment function 117 is a control module that provides navigation instructions to first drone 120 and instruction communications to second drone 130 to attain a position alignment for package transfer between first drone 120 and second drone 130. In some embodiments, alignment function 117 initiates navigation instructions to first drone 120 and second drone 130 upon detecting a pre-determined proximity and is based on GPS data of the positions and orientation of both first drone 120 and second drone 130. Alignment function 117 achieves a vertical alignment of first drone 120 and second drone 130 for mid-air package transfer.

Interference reduction program 400 provides instruction to adjust the rotor positions of a pair of drones that are vertically aligned to enable a mid-air package transfer between the pair of drones, such as first drone 120 and second drone 130. Interference reduction program 400 initiates rotor position adjustment in response to detection of air pressure interference between the vertically aligned drones as the approach, based on measurement data received from air pressure sensors 125. Interference reduction program 400 extends telescopic arms of first drone 120 and second drone 130 to create a separation distance which reduces and may eliminate detectable air pressure interference between the drones, thus stabilizing the positioning of the drones during package transfer. In response to the completion of package transfer and separation of the vertically aligned drones, interference reduction program 400 returns the rotor positions to their original state.

Figure 3A:
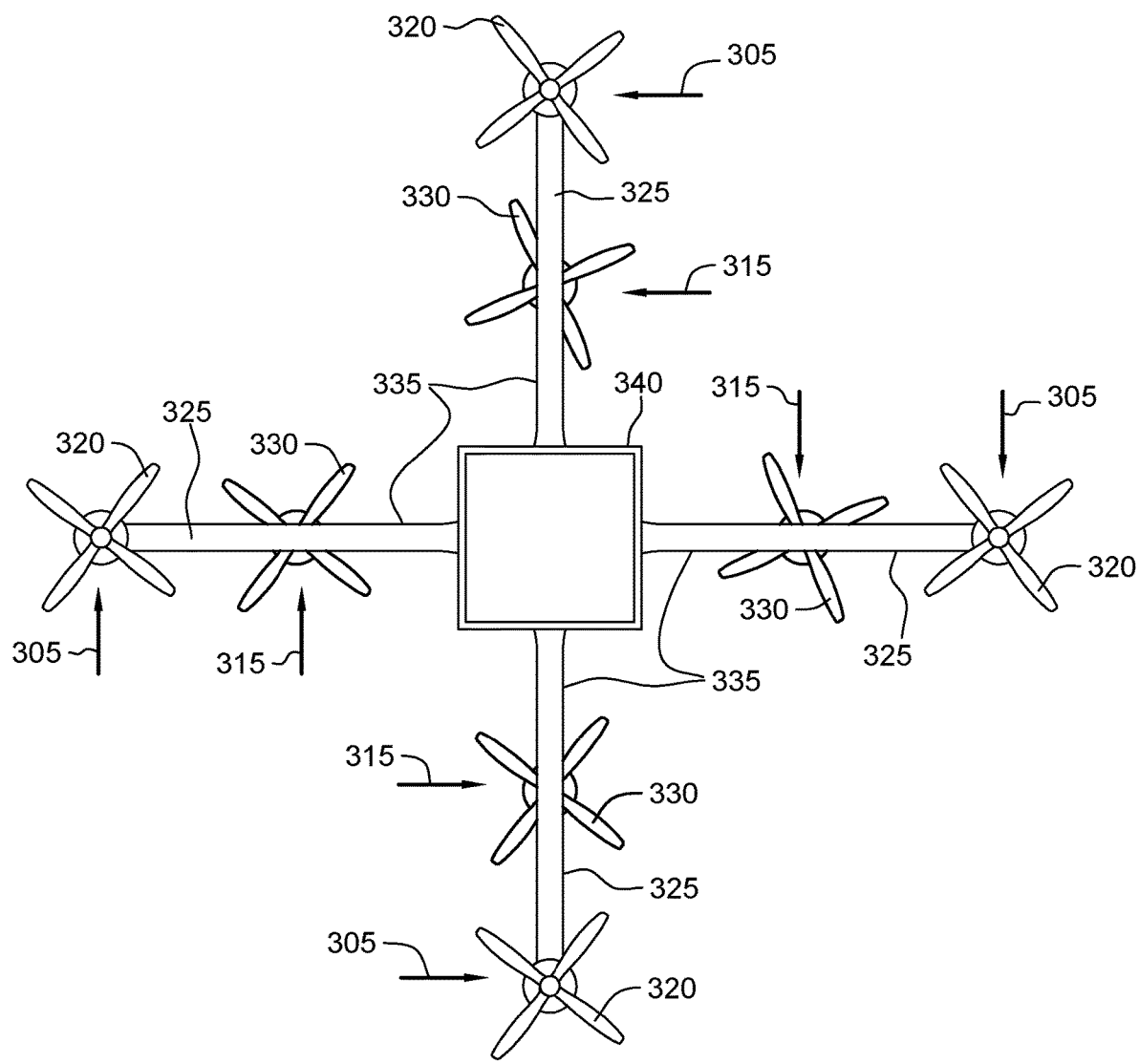
FIG. 3A illustrates a top view of adjusted rotor positions of a pair of drones vertically aligned for mid-air package transfer, in accordance with an embodiment of the present invention.

In an example embodiment, interference reduction program sends an instruction to drive motors of first drone 120 to retract the rotor positions into the respective telescopic arms of first drone 120, while communicating instructions to second drone 130 to drive motors of second drone 130 to extend respective telescopic arms of the rotors, creating a separation distance between the horizontal positioning of rotors, and reducing air pressure interference (see FIG. 3A). In another example embodiment, the retraction and extension instructions may be reversed for the respective drones in the same vertical alignment, (i.e., extend the telescopic rotor arms of first drone 120 and retract the telescopic rotor arms of second drone 130), achieving the same effect of reducing the air pressure interference.

Figure 3B:
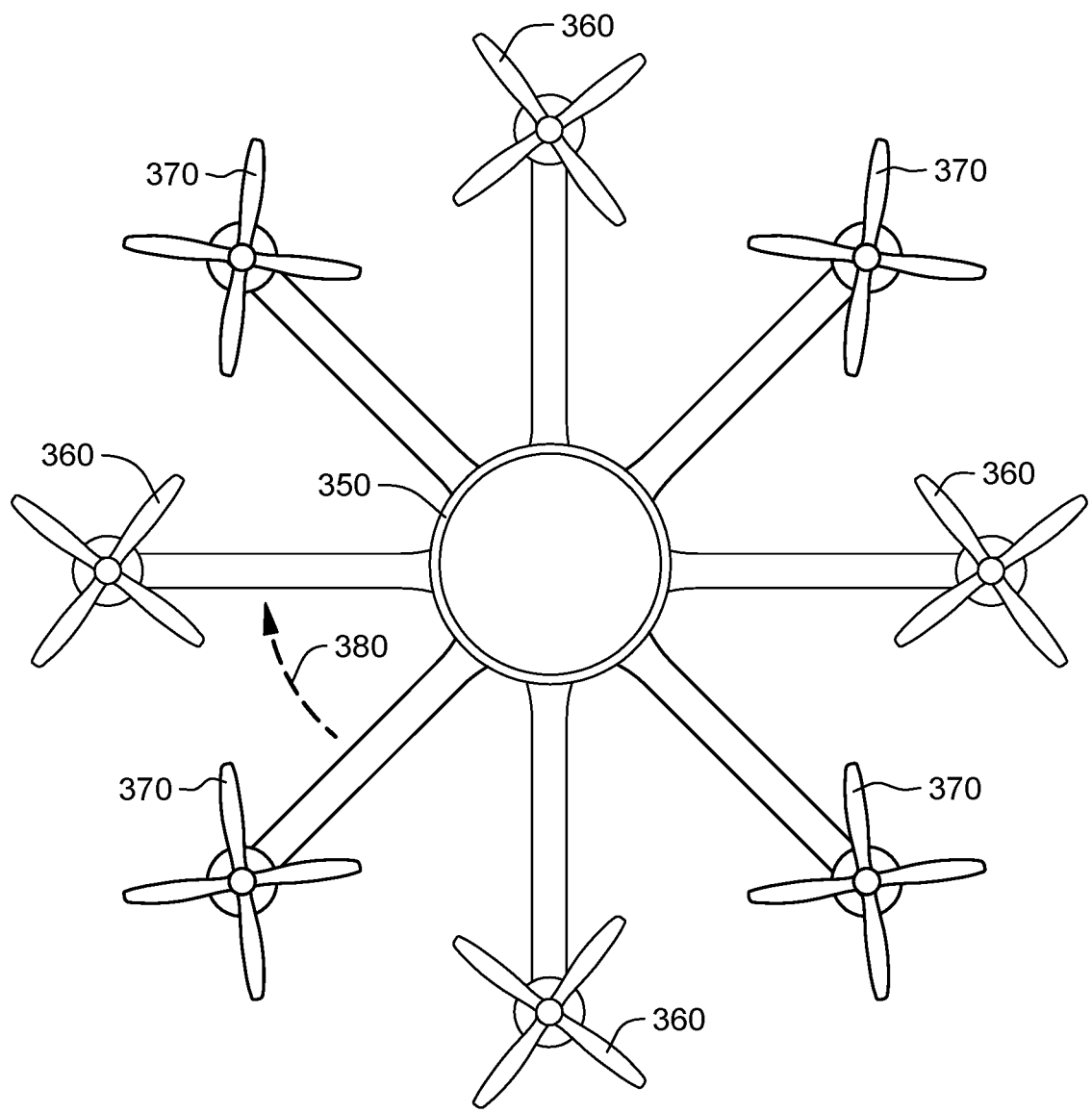
FIG. 3B illustrates a top view of an alternate adjustment of rotor positions of a pair of drones vertically aligned for mid-air package transfer, in accordance with an embodiment of the present invention.

In another example embodiment, the telescopic arms of first drone 120 are configured to adjust the horizontal position of the rotor up to 45 degrees in a clockwise (or counter-clockwise) direction, thus positioning the rotors of first drone 120 to a midpoint between rotors of second drone 130 (see FIG. 3B).

First drone 120 is depicted in a horizontal view aligned with second drone 130. First drone 120 includes rotor 123, air pressure sensor 125, rotor arm 127, and communication antennae 129, which provides wireless connection to second drone 130 and computing device 110 via network 150. First drone 120 also includes low-pressure area 160 and high-pressure area 165. First drone 120 includes 4 instances of rotor 123 (side view depicts 3 of the 4 rotors). In other embodiments, first drone 120 may include additional rotors, for example, 6 rotors. First drone 120 includes a central cavity configured to receive or transfer a package in mid-air flight.

Rotor 123 is attached to rotor arm 127 and is powered to rotate at high speed, in some cases exceeding 10,000 revolutions per minute (rpms), to generate lift for first drone 120. Rotor 123 includes one or more propellers that when rotated produce a downward thrust, and when tipped produce a component horizontal thrust. Speed adjustments of rotor 123 influence the altitude of first drone 120 and in combination with all rotors of first drone 120 provide a navigational capability. First drone 120 is depicted as including air pressure sensor 125 positioned to detect the air pressure above rotor 123.

Air pressure sensor 125 is a sensor that measures the air pressure associated with the operation of rotor 123 of first drone 120. In some embodiments, the positioning of air pressure sensor enables the measurement of air pressure in a vicinity above rotor 123, while in other embodiments, air pressure sensor 125 is positioned to measure air pressure below rotor 123 (not shown). Some embodiments may include air pressure sensor 125 both above and below rotor 123. Air pressure sensor 125 provides air pressure change data to interference reduction program 400 operating on computing device 110.

Rotor arm 127 is representative of all rotor arms of first drone 120. Rotor arm 127 secures and supports rotor 123, includes a source or transfer of energy to provide rotation to rotor 123, and is configured to adjust the position of rotor 123. In some embodiments, rotor arm 127 is a telescopic arm that can extend to position rotor 123 further away from the center portion of first drone 120. In other embodiments, rotor arm 127 can retract to decrease the distance of rotor 123 from the central portion of first drone 120. In yet other embodiments, rotor arm 127 is adjustable horizontally to a 45-degree change of position from an original default position. Rotor arm 127 enables an adjustment of rotor 123, such that air pressure interference with another drone during mid-air package transfer (such as second drone 130), is reduced or eliminated. The reduction or elimination of air pressure interference provides increased stability for successful package transfer.

Communication antennae 129 enables wireless communication between first drone 120 and second drone 130, and first drone 120 and computing device 110, via network 150. The wireless connection is indicated by the dashed lines connecting communication antennae 129 and network 150. In some embodiments, interference reduction program 400 operates from remotely located computing device 110 and communicates with first drone 120 via network 150 and antennae 129.

Low-pressure area 160 is an area of space above rotor 123 from which rotor 123 draws in air and accelerates the air downwards towards high-pressure area 165. Airflow from low-pressure area 160 to rotor 123 rotating at a high speed, creates a lower air pressure above rotor 123. The lower air pressure is measured by air pressure sensor 125.

High-pressure area 165 is an area of space below rotor 123 to which rotor 123 forces air downwards by high-speed rotation of propellers of rotor 123. The downward force of the airflow from rotor 123 contacts air below rotor 123 and generates a high-pressure condition relative to default air pressure (air pressure of space removed from the vicinity of rotor 123 and other rotors of first drone 120). The condition of low-pressure area 160 above rotor 123 and high-pressure area 165 below rotor 123 creates lift for first drone 120 enabling flight.

Second drone 130 is depicted in a horizontal view with first drone 120. Second drone 130 is illustrated as vertically aligned below first drone 120. Second drone 130 includes rotor 133, air pressure sensor 135, rotor arm 137, and communication antennae 139. First drone 130 also includes low-pressure area 170, high-pressure area 175. Second drone 130 includes 4 instances of rotor 133 (side view depicts 3 of the 4 rotors), and second drone 130 also includes a central cavity configured to receive or transfer a package in mid-air flight.

Rotor 133 is similar to rotor 123 and is attached to rotor arm 137 and delivers power to rotate rotor 133 at high speed to generate lift for second drone 130. Rotor 133 includes one or more propellers that when rotated produce a downward thrust, and when tipped produce a component horizontal thrust. Speed adjustments of rotor 133 influence the altitude of first drone 130 and in combination with all rotors of second drone 130 provide the navigational capability. Second drone 130 is depicted as including air pressure sensor 135 positioned to detect the air pressure above rotor 133.

Air pressure sensor 135 is a sensor that measures the air pressure associated with the operation of rotor 133 of second drone 130. In some embodiments, the positioning of air pressure sensor 135 enables the measurement of air pressure in a vicinity above rotor 133, while in other embodiments, air pressure sensor 135 is positioned to measure air pressure below rotor 133 (not shown). Some embodiments may include air pressure sensor 135 both above and below rotor 133. Air pressure sensor 135 provides air pressure change data to interference reduction program 400 operating on computing device 110.

Rotor arm 137 is representative of all rotor arms of second drone 130. Rotor arm 137 secures and supports rotor 133, includes a source or transfer of energy to provide rotation to rotor 133, and is configured to adjust the position of rotor 133. In some embodiments, rotor arm 137 is a telescopic arm that can extend to position rotor 133 further away from the center portion of second drone 130. In other embodiments, rotor arm 137 can retract to decrease the distance of rotor 133 from the central portion of second drone 130. In yet other embodiments, rotor arm 137 is adjustable horizontally to a 45-degree change of position from an original default position. Rotor arm 137 enables an adjustment of rotor 133, such that air pressure interference with another drone during mid-air package transfer (such as second drone 130), is reduced or eliminated. The reduction or elimination of air pressure interference provides increased stability for successful package transfer.

Communication antennae 139 enables wireless communication between second drone 130 and first drone 120, and second drone 130 and computing device 110, via network 150. The wireless connection is indicated by the dashed lines connecting communication antennae 139 and network 150. In some embodiments, interference reduction program 400 operates from remotely located computing device 110 and communicates with second drone 130 via network 150 and antennae 139.

Interference area 170 is an area of space above rotor 133 from which rotor 133 draws in air and accelerates the air downwards towards high-pressure area 175. Airflow from interference area 170 is affected by the high-pressure area 165 generated by rotor 123 of the vertical alignment and proximity of first drone 120. The air forced downward from rotor 123 interferes with the generation of a low-pressure area above rotor 133. The interference generates higher air pressure and affects the lift generated by rotor 133, which has the effect of compromising the altitude and stability of second drone 130. The air pressure of interference area 170 is measured by air pressure sensor 135, and provides measurement data to interference reduction program 400 indicating the air pressure issues of interference area 170. In embodiments of the present invention, the positions of rotor 123 of first drone 120 and rotor 133 of second drone 130 are adjusted to create horizontal distance between the rotors and reduce or eliminate air pressure interference that occurs in interference area 170.

High-pressure area 175 is an area of space below rotor 133 to which rotor 133 forces air downwards by high-speed rotation of propellers of rotor 133. The downward force of the airflow from rotor 133 contacts air below rotor 123 and generates a high-pressure condition relative to default air pressure (air pressure of space removed from the vicinity of rotor 133 and other rotors of second drone 130). The occurrence of air pressure interference in interference area 170 affects the relative air pressure conditions above and below rotor 133 and results in a destabilization of second drone 130, risking difficult or unsuccessful package transfer.

Figure 2A:
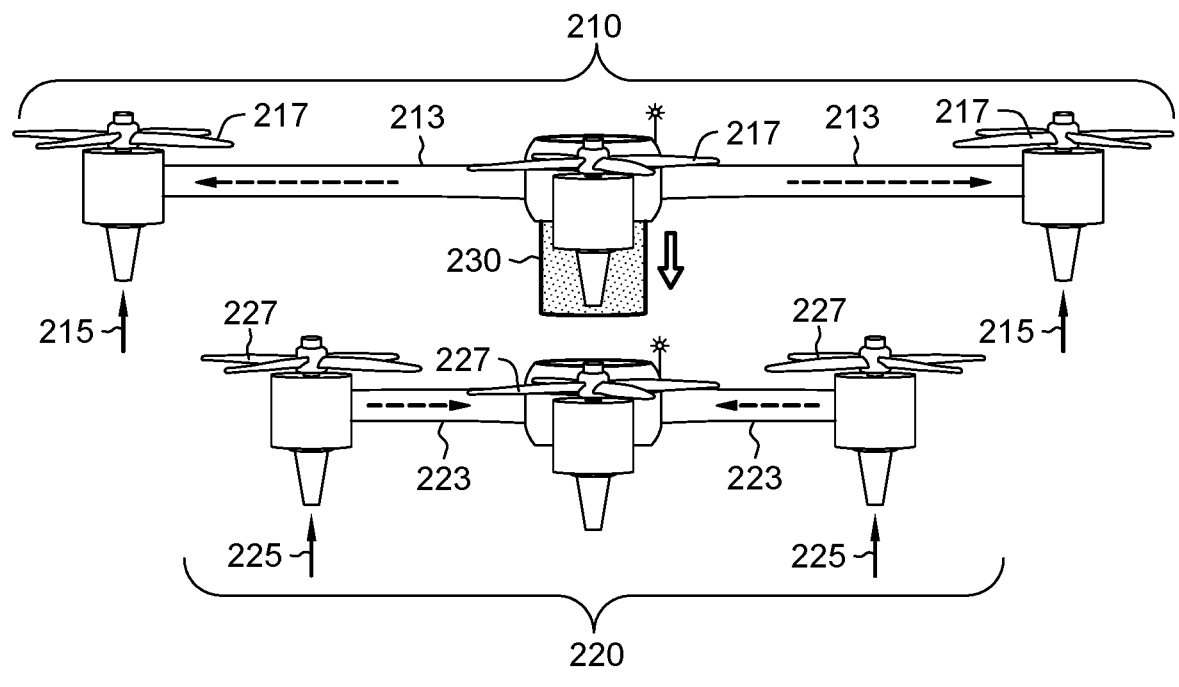
FIG. 2A depicts an example in which rotor position adjustments are made for a descending package transfer between vertically aligned drones, in accordance with an embodiment of the present invention.

FIG. 2A depicts an example embodiment of the present invention in which rotor position adjustments are made for a descending package transfer between vertically aligned drones, in accordance with an embodiment of the present invention. FIG. 2A includes first drone 210 depicted at a relative position above and vertically aligned with second drone 220, depicted as below and aligned with first drone 210. First drone 210 includes rotor arms 213, rotors 217, and package 230, which is intended for transfer to second drone 220 by lowering package 230 from a central cavity of first drone 210 to be secured into a central cavity of second drone 220. Interference reduction program 400 has adjusted rotor arms 213 of first drone 210 outward from the central cavity of first drone 210 along the axis of rotor arms 213 to extended positions 215. FIG. 2A also illustrates that interference reduction program 400 has adjusted rotor arms 223 of second drone 220 to retracted positions 225. Interference reduction program 400 reduces or eliminates the air pressure interference by performing extension and retraction of respective rotor arms, enabling stability to perform the package transfer between first drone 210 and second drone 220.

Figure 2B:
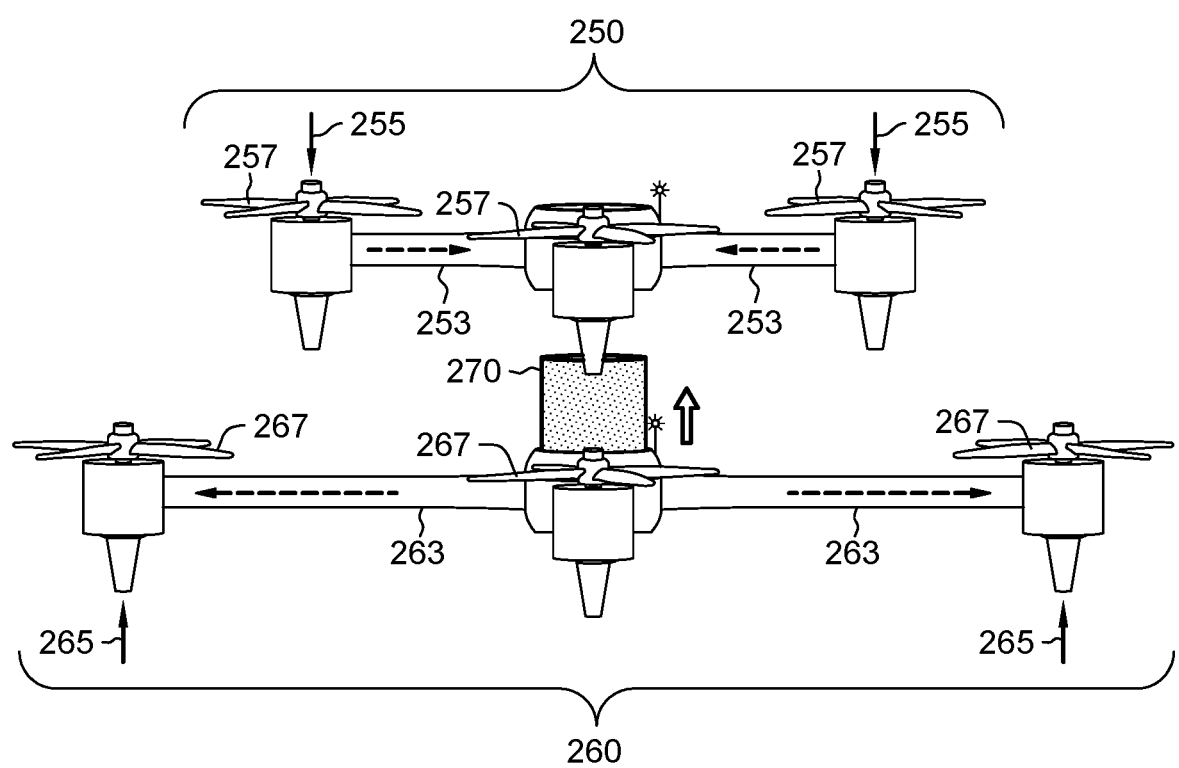
FIG. 2B depicts an alternate example in which rotor position adjustments are made for an ascending package transfer between vertically aligned drones, in accordance with an embodiment of the present invention.

FIG. 2B depicts an alternate example embodiment of the present invention in which rotor position adjustments are made for an ascending package transfer between vertically aligned drones, in accordance with an embodiment of the present invention. FIG. 2B include first drone 250 and second drone 260, in which second drone 260 is vertically aligned and below first drone 250, and package 270 is intended for an ascending transfer from second drone 260 to first drone 250. First drone 250 includes rotors 257 and rotor arms 253.

In an embodiment depicted in FIG. 2B, interference reduction program 400 has adjusted rotor arms 253, which are telescopic, to retract rotors 257 closer to the central cavity of first drone 250, along the axis of rotor arms 253, to respective retracted positions 255. Interference reduction program 400 has communicated with second drone 260 to extend rotor arms 263 outward away from the central cavity of second drone 260 to respective extended positions 265. Interference reduction program 400 reduces or eliminates the air pressure interference by performing extension and retraction of respective rotor arms, enabling stability to perform the package transfer between first drone 210 and second drone 220.

A person of ordinary skill in the art will recognize that the choice of which drone extends or retracts rotor arms to create separation of rotor position alignment for mid-air package transfer is immaterial, provided the measured air pressure interference is reduced or eliminated to provide a stable transfer.

FIG. 3A illustrates a top view of adjusted rotor positions of a pair of drones vertically aligned for mid-air package transfer, in accordance with an embodiment of the present invention. In some embodiments, interference reduction program 400 operates in a computing device included in a first drone of a pair of drones positioning into vertical alignment to perform a mid-air package transfer. In other embodiments, interference reduction program 400 operates from a computing device included in the second drone of the pair of drones, communicating with the first drone to perform rotor arm adjustments to re-position drone rotors to reduce or eliminate air pressure interference. In yet other embodiments, both the first drone and the second drone of the pair of drones engaged in mid-air package transfer include a computing device operating interference reduction program 400 and performing communications between the first drone and the second drone to achieve separated rotor positions while maintaining vertical alignment for successful package transfer. In still other embodiments, interference reduction program 400 operates on a remote computing device and communicates with both the first drone and the second drone of the pair of vertically aligned drones and provides instructions to adjust the positions of respective rotors to reduce or eliminate air pressure interference.

FIG. 3A includes first drone rotors 320, first drone telescopic rotor arms 325, extended positions 305, second drone rotors 330, second drone telescopic rotor arms 335, retracted positions 315, and package-carrying cavity 340. In some embodiments of the present invention, interference reduction program 400 activates first drone telescopic rotor arms 325 to extend outward away from package-carrying cavity 340 and communicates to activate second drone telescopic rotor arms 335 to retract towards package-carrying cavity 340.

FIG. 3B illustrates a top view of an alternate adjustment of rotor positions of a pair of drones vertically aligned for mid-air package transfer, in accordance with an embodiment of the present invention. FIG. 3B depicts a first drone and a second drone with rotors located at the ends of rotor arms, and the rotors of the first drone and the second drone offset, such that the rotors of the upper drone are not directly located over the rotors of the lower drone. Rotors 360 correspond to the first drone and rotors 370 correspond to the second drone.

In an example embodiment, interference reduction program 400 has directed instructions to the first drone to adjust the rotor arms by moving them horizontally bisecting the distance between rotors 360 of the first drone from rotors 370 of the second drone, as opposed to extending and retracting telescopic rotor arms. The adjustment of the arms of the first drone includes a rotation in the same horizontal plane, and in some embodiments, make up to a 45-degree angle offset from the original position of the arms of the first drone. In some embodiments, interference reduction program 400 directs instruction to both the first drone and the second drone to adjust rotor arms by moving them up to 22.5 degrees, but in opposite directions for respective drones. The horizontal adjustment achieves the offset positioning of rotors 360 and rotors 370 and reduces or eliminates air pressure interference from occurring as the first drone and second drone perform a mid-air package transfer.

Figure 4:
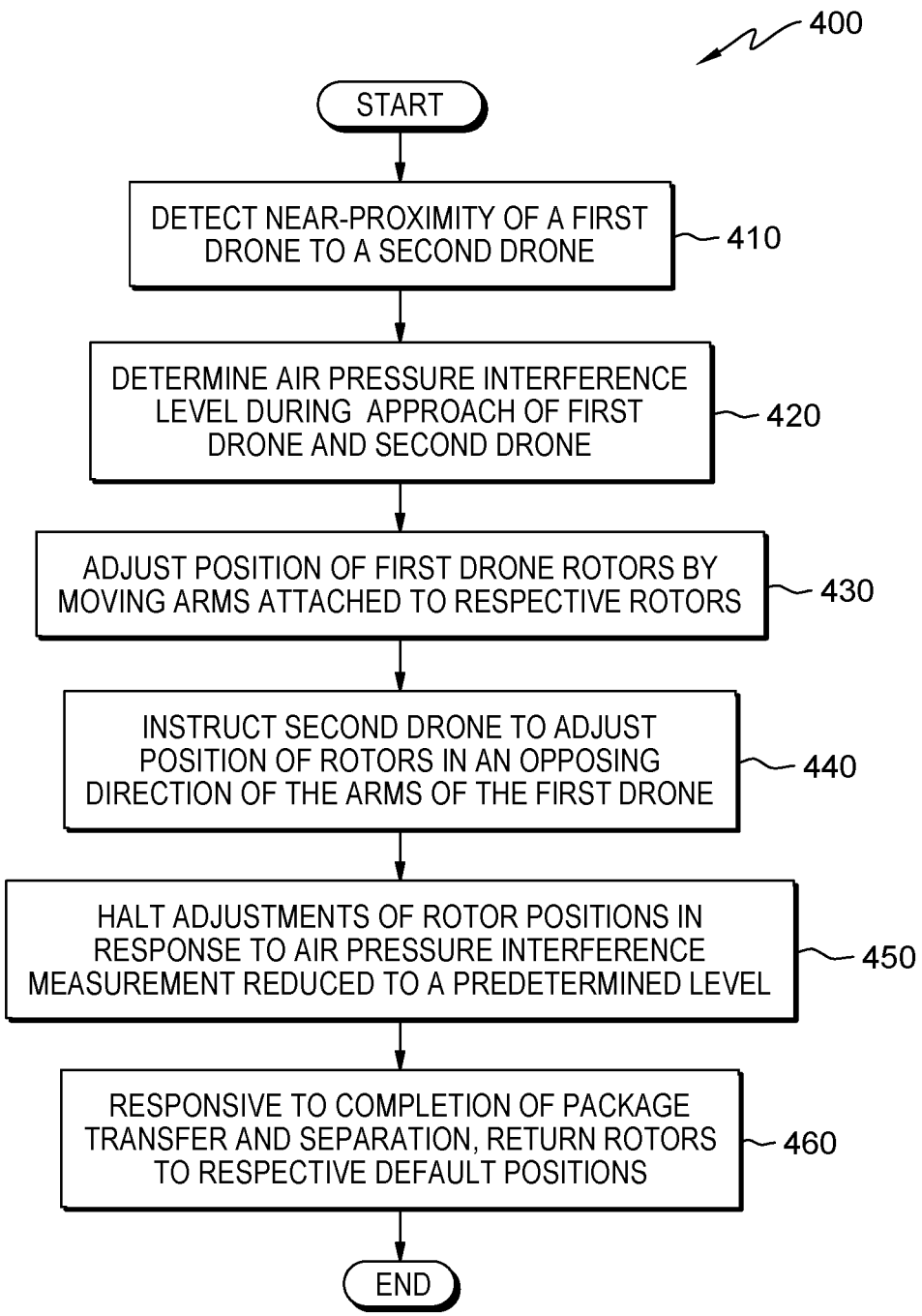
FIG. 4 is a flowchart depicting operational steps of an interference reduction program, operating in the distributed data processing environment of FIG. 1, in accordance with embodiments of the present invention.

FIG. 4 is a flowchart depicting operational steps of interference reduction program 400, operating in the distributed network mid-air transfer environment of FIG. 1, in accordance with embodiments of the present invention. Interference reduction program 400 instructs adjustment of the positions of the rotors of a pair of drones performing a mid-air package transfer, enabling close vertical alignment and proximity without instability caused by air pressure interference of rotors of the top-positioned drone on rotors of the lower-positioned drone rotors.

Interference reduction program 400 detects the near-proximity of a first drone to a second drone (step 410). The first drone and the second drone are navigating to achieve a vertical alignment to perform a mid-air package transfer. Interference reduction program 400 is initiated as the first drone and the second drone reach a pre-determined proximity to each other while navigating towards a vertical alignment.

In some embodiments, interference reduction program 400 is operating within a computing device integral to the first drone and communicates instructions to the second drone. In other embodiments, interference reduction program 400 operates from a computing device integral to the second drone and provides instructions to the first drone. In yet other embodiments, interference reduction program 400 operates in respective computing devices integral to the first drone and the second drone, and perform communication between respective drones. In still other embodiments, interference reduction program 400 operates from a remote computing device and communicates to the first drone and the second drone via wireless network communications.

For example, interference reduction program 400 operates from computing device 110 (FIG. 1), which is included in first drone 120 and is initiated as GPS signals from first drone 120 and second drone 130, received via network 150, indicate that a pre-determined proximity distance between first drone 120 and second drone 130 has been reached.

Interference reduction program 400 determines the level of air pressure interference during the approach between the first drone and the second drone (step 420). Interference reduction program 400 receives air pressure measurements from rotor intake areas of the first drone and second drone approaching a vertical alignment. Interference reduction program 400 determines the level of air pressure interference by comparison of air pressure measurement of the rotor intake areas of both the first drone and the second drone, noting air pressure in the intake area of the lower positioned drone as higher than the air pressure in the intake area of the upper positioned drone. The higher air pressure in the intake area affects the lift forces generated by the drone rotors and creates instability in the alignment of the drone pair for mid-air package transfer.

For example, as first drone 120 (FIG. 1) and second drone 130 navigate to vertically align for mid-air package transfer, interference program 400 receives measurements of air pressure in the intake areas of rotors 123 of first drone 120 and rotors 133 of second drone 130. The measurement data received by interference reduction program 400 includes air pressure measurements from low-pressure area 160 and interference area 170 from respective air pressure sensors 125 and 135. Interference reduction program 400 determines the difference in air pressure between low-pressure area 160 and interference area 170, indicating the level of interference caused by the higher pressure from air discharge of rotor 123 of first drone 120 affecting the air pressure above rotor 133 of second drone 130.

Interference reduction program 400 adjusts the position of the rotors of the first drone by moving the arms attached to the respective rotors (step 430). In some embodiments of the present invention, the rotor arms, which are arm-like structures of a drone to which rotors are attached, are telescopic and are configured to extend or retract from a default position relative to the central cavity of the drone. In some embodiments, interference reduction program 400 initiates adjustment of the rotor arms of the first drone to create a separation from the vertical alignment position of the rotors of the second drone of a pair of drones performing a mid-air package transfer. In other embodiments, interference reduction program 400 adjusts the rotor arms of the first drone by moving the rotor arms horizontally up to a position bifurcating the rotor positions of the second drone, creating an offset position of the rotors of the first drone, with respect to rotors of the second drone.

For example, interference reduction program 400 extends rotor arms 127 of first drone 120 away from the central cavity of first drone 120, by initiating the telescopic features of rotor arms 127 and creating a separation from the rotors of second drone 130. In another example, interference reduction program 400 adjusts rotor arms 127 of first drone 120 in a clockwise horizontal direction to a midpoint position between rotors 133 of second drone 130.

Interference reduction program 400 instructs the second drone to adjust the position of rotors in an opposing direction of the arm adjustments made by the first drone (step 440). Interference reduction program 400 communicates with the second drone and initiates the adjustment of the rotor arms of the second drone in an opposing direction to the adjustments made to the rotor arms of the first drone. The combination of adjustments of rotors of the first drone and rotors of the second drone in opposite directions increases the separation distance of the rotors while maintaining the vertical alignment for successful mid-air package transfer.

In some embodiments, interference reduction program 400 performs adjustments to the rotor arms of the first drone prior to initiating adjustments to the rotor arms of the second drone. Interference reduction program 400 determines whether the adjustments made to the rotor positions of the first drone are adequate to reduce the level of interference below a predetermined threshold level, and responsive to the interference level remaining above the predetermined threshold level, interference reduction program 400 initiates adjustments of the rotor arms of the second drone in the opposite direction of adjustments made to the rotor arms of the first drone and continues to monitor the measurement of air pressure interference.

For example, interference reduction program 400 communicates with second drone 130 and initiates the retraction of rotor arms 137 towards the center cavity of second drone 130, which moves rotors 133 in an opposite direction of the extension of rotors 123 of first drone 120.

Interference reduction program 400 halts adjustments of rotor positions, in response to determining that air pressure interference is reduced to a predetermined level (step 450). In embodiments of the present invention, interference reduction program 400 maintains the adjustment activity of the rotor arms of the first drone and the rotor arms of the second drone, while receiving measurement data of the air pressure in the intake areas of the respective rotors. Interference reduction program 400 halts the adjustments to the rotor positions in response to determining that the air pressure interference level has been reduced below a predetermined threshold level. In some embodiments, interference reduction program 400 adjusts the rotor arms of the first drone to a full extent prior to initiating adjustment to the rotor arms of the second drone. In other embodiments, interference reduction program 400 maintains adjustment activity of both the rotor arms of the first drone and the rotor arms of the second drone, in opposing directions. Interference reduction program 400 halts adjustments in response to the level of air pressure interference reduced below a predetermined threshold.

For example, interference reduction program 400 maintains adjustment of extending rotor arms 127 of first drone 120 and retraction of rotor arms 137 of second drone 130, while measuring the air pressure data from air pressure sensors 125 and 135 and determining whether the air pressure interference level has been reduced below a predetermined threshold level. In response to interference reduction program 400 determining that the air pressure interference level has been reduced below the predetermined threshold level, interference reduction program 400 halts the adjustments of rotor arms 127 of first drone 120 and rotor arms 137 of second drone 130. In another example, interference reduction program 400 extends rotor arms 127 of first drone 120 and initiates the adjustment to rotor arms 137 of second drone 130 in response to the air pressure interference level remaining above the predetermined threshold level after rotor arms 127 of first drone 120 have reached the limit of adjustment. Interference reduction program 400 performs adjustments to rotor arms 137 of second drone 130, halting the adjustment in response to the air pressure interference determined to be reduced below the predetermined threshold level.

Responsive to completion of package transfer and drone separation, interference reduction program 400 returns rotors to respective default positions (step 460). Interference reduction program 400 determines the completion of mid-air package transfer between the first drone and the second drone and initiates rotor arm adjustments that return the rotors of respective drones to default positions in which the rotors were located prior to mid-air package transfer. In some embodiments, interference reduction program receives confirmation that the pair of drones have separated subsequent to successful mid-air package transfer and, in response, initiates adjustments to the rotor arms of the first drone and the second drone returning respective rotors to a position held prior to the alignment for mid-air package transfer. In some embodiments, interference reduction program 400 receives the confirmation of drone separation, based on GPS data of respective drone positions.

For example, interference reduction program 400 receives GPS data indicating positions of first drone 120 relative to the position of second drone 130, indicating a predetermined separation distance. Interference reduction program 400 initiates adjustment of rotor arms 127 of first drone 120 and rotor arms 137 of second drone 130 and continues adjustment of rotor position. In response to rotors 123 of first drone 120 and rotors 133 of second drone 130 reaching a default position corresponding to the respective positions of rotors 123 and rotors 133 prior to adjustments made by interference reduction program 400 during alignment for mid-air package transfer.

Having returned rotors for the pair of drones to default positions, interference reduction program 400 ends.

Figure 5:
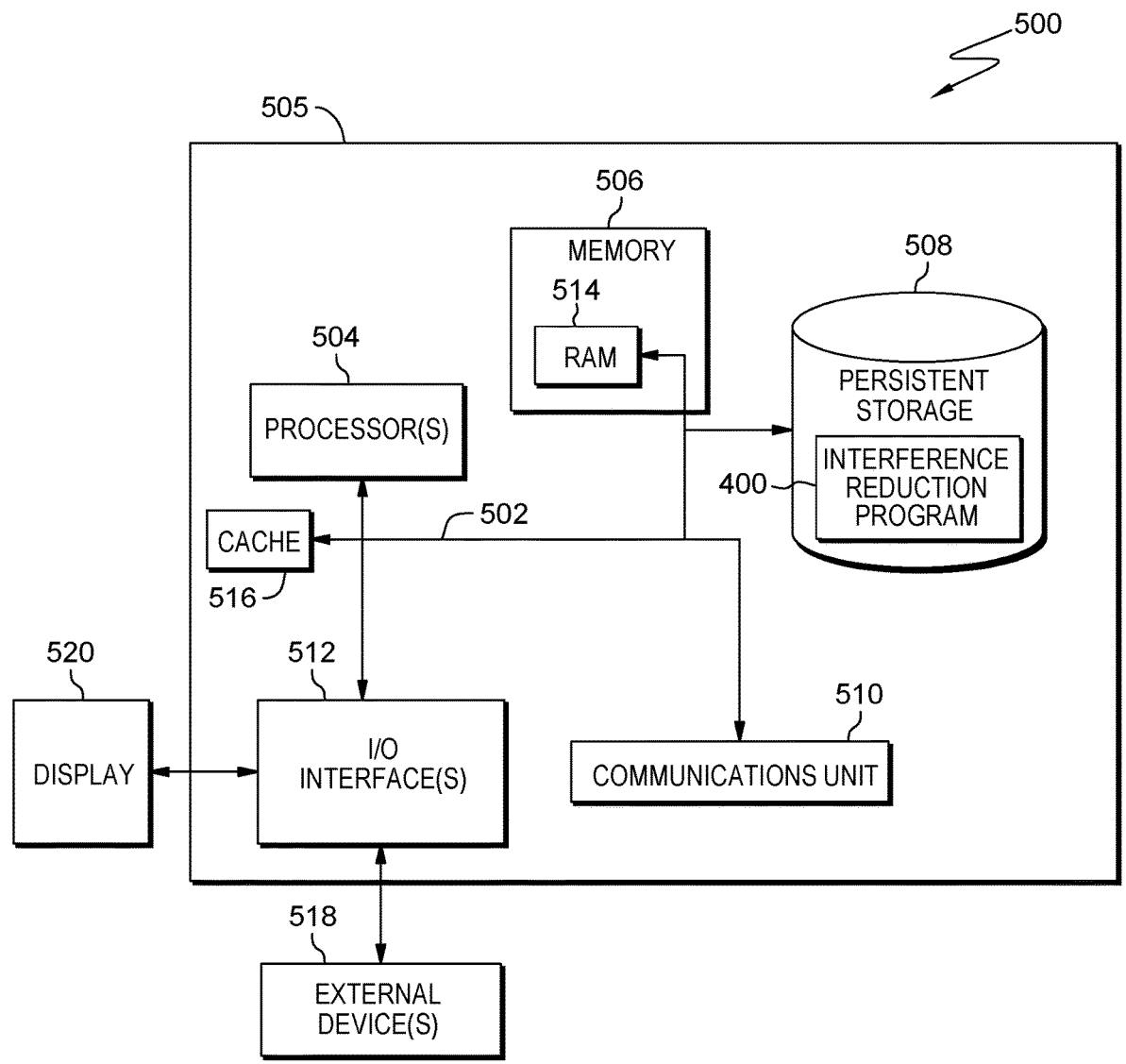
FIG. 5 depicts a block diagram of components of a computing system operating within a drone and configured to operationally perform the interference reduction program of FIG. 4, in accordance with an embodiment of the present invention.

FIG. 5 depicts a block diagram of components of a computing system operating within a drone and configured to operationally perform interference reduction program 400 of FIG. 4, in accordance with an embodiment of the present invention. Computing device 505 includes components and functional capability similar to components of computing device 110, (FIG. 1), in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, an input/output (I/O) interface(s) 512. Communications fabric 502 can be implemented with any architecture designed for passing data and/or control information between processors (such as microprocessors, communications, and network processors, etc.), system memory, peripheral devices, and any other hardware components within a system. For example, communications fabric 502 can be implemented with one or more buses.

Memory 506, cache memory 516, and persistent storage 508 are computer-readable storage media. In this embodiment, memory 506 includes random access memory (RAM) 514. In general, memory 506 can include any suitable volatile or non-volatile computer-readable storage media.

In one embodiment, interference reduction program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed network mid-air transfer environment 100. In these examples, communications unit 510 includes one or more network interface cards. Communications unit 510 may provide communications through the use of either or both physical and wireless communications links. Interference reduction program 400 may be downloaded to persistent storage 508 through communications unit 510.

I/O interface(s) 512 allows for the input and output of data with other devices that may be connected to computing system 500. For example, I/O interface 512 may provide a connection to external devices 518 such as a remote controller, a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., interference reduction program 400 can be stored on such portable computer-readable storage media and can be loaded onto persistent storage 508 via I/O interface(s) 512. I/O interface(s) 512 also connects to a display 520.

Display 520 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media)

having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for stabilizing a pair of drones performing a mid-air package transfer, the method comprising:
    detecting, by one or more processors, that a first drone is located above, and vertically aligned with a second drone;
    determining, by the one or more processors, an air pressure interference level of an area located between rotors of the first drone and rotors of the second drone, wherein the air pressure interference level is calculated based on a difference in air pressure between respective rotor intake areas of the rotors of first drone and the rotors of the second drone;

adjusting, by the one or more processors, positions of the rotors of the first drone while maintaining an orientation of the rotors of the first drone, wherein the adjusting includes moving arms of the first drone to which the rotors of the first drone are attached in a first direction along a horizontal plane with respect to a central cavity of the first drone, wherein the arms of the first drone are moved in the first direction along the horizontal plane until the air pressure interference level of the area located between the rotors of the first drone and the rotors of the second drone is below a predetermined threshold; and responsive to determining completion of a package transfer, adjusting, by the one or more processors, the positions of the rotors of the first drone to respective original positions.

2. The method of claim 1, wherein an adjustment of the positions of the rotors of the first drone is performed by activating telescopic arms attached to respective rotors of the first drone.

3. The method of claim 1, wherein adjusting, by the one or more processors, the positions of the rotors of the first drone in the first direction includes a telescopic movement of the arm attached to the respective rotors of the first drone.

4. The method of claim 1, wherein moving the arms attached to respective rotors of the first drone in the first direction includes a a rotation of the arms in the horizontal plane around the central cavity of the first drone up to a midpoint position between rotors of the second drone.

5. The method of claim 1, further comprising:

measuring, by the one or more processors, a change in the air pressure interference level of the area located between the rotors of the first drone and the rotors of the second drone as the arms of the first drone move in the first direction along the horizontal plane with respect to the central cavity of the first drone; and determining, by the one or more processors, positions of the rotors of the first drone and the rotors of the second drone that result in stabilized positions of the first drone and the second drone, based on a reduction of the air pressure interference level of the area located between the rotors of the first drone and the rotors of the second drone.

6. The method of claim 1, further comprising:

responsive to detecting an inadequate reduction of the air pressure interference level of the area located between the rotors of the first drone and the rotors of the second drone, adjusting, by the one or more processors, positions of the rotors of the second drone while maintaining an orientation of the rotors of the second drone, wherein the adjusting includes moving arms of the second drone, to which rotors of the second drone are attached, in a second direction along a horizontal plane with respect to a central cavity of the second drone, wherein the second direction increases a separation between the rotors of the first drone and the rotors of the second drone, and wherein an amount of the separation is based on a detection of an adequate reduction in the air pressure interference level of the area located between the rotors of the first drone and the rotors of the second drone to maintain stability.

7. The method of claim 1, wherein adjusting, by the one or more processors, positions of the rotors of the first drone further comprises:

adjusting, by the one or more processors, the positions of the rotors of the first drone by a combination of movement of the arms in the first direction along the horizontal plane with respect to the central cavity of the first drone, and a rotation of the arms in the horizontal plane around the central cavity of the first drone.

8. A computer program product for stabilizing a pair of drones performing a mid-air package transfer, the computer program product comprising:

one or more computer-readable storage media, and program instructions stored on the one or more computer-readable storage media, the program instructions comprising:

program instructions to detect that a first drone is located above, and vertically aligned with a second drone;

program instructions to determining an air pressure interference level of an area located between rotors of the first drone and rotors of the second drone, wherein the air pressure interference level is calculated based on a difference in air pressure between respective rotor intake areas of the rotors of first drone and the rotors of the second drone;

program instructions to adjust positions of the rotors of the first drone while maintaining an orientation of the rotors of the first drone, wherein the adjusting includes moving arms of the first drone to which the rotors of the first drone are attached in a first direction along a horizontal plane with respect to a central cavity of the first drone, wherein the arms of the first drone are moved in the first direction along the horizontal plane until the air pressure interference level of the area located between the rotors of the first drone and the rotors of the second drone is below a predetermined threshold; and responsive to determining completion of a package transfer, program instructions to adjust the positions of the rotors of the first drone to respective original positions.

9. The computer program product of claim 8, wherein an adjustment of the positions of the rotors of the first drone is performed by program instructions to activate telescopic arms attached to respective rotors of the first drone.

10. The computer program product of claim 8, wherein program instructions to adjust the positions of the rotors of the first drone in the first direction includes program instructions for a telescopic movement of the arm attached to the respective rotors of the first drone.

11. The computer program product of claim 8, wherein moving the arms attached to respective rotors of the first drone in the first direction includes rotation of the arms in the horizontal plane around the central cavity of the first drone up to a midpoint position between rotors of the second drone.

12. The computer program product of claim 8, further comprising:

program instructions to measure a change in the air pressure interference level of the rea located between the rotors of the first drone and the rotors of the second drone as the arms of the first drone move in the first direction along the horizontal plane with respect to the central cavity of the first drone; and program instructions to determine positions of the rotors of the first drone and the rotors of the second drone that result in stabilized positions of the first drone and the second drone, based on a reduction of the air pressure interference level of the area located between the rotors of the first drone and the rotors of the second drone.

13. The computer program product of claim 8, further comprising:
responsive to detecting an inadequate reduction of the air pressure interference level of the area located between the rotors of the first drone and the rotors of the second drone, program instructions to adjust positions of the rotors of the second drone while maintaining an orientation of the rotors of the second drone, wherein the adjusting includes moving arms of the second drone, to which rotors of the second drone are attached in a second direction along a horizontal plane with respect to a central cavity of the second drone, wherein the second direction increases a separation between the rotors of the first drone and the rotors of the second drone, and wherein an amount of the separation is based on a detection of an adequate reduction in the air pressure interference level of the area located between the rotors of the first drone and the rotors of the second drone to maintain stability.

14. The computer program product of claim 8, wherein the program instructions to adjust positions of the rotors of the first drone further comprises:
adjusting the positions of the rotors of the first drone by a combination of movement of the arms in the first direction along the horizontal plane with respect to the central cavity of the first drone, and a rotation of the arms in the horizontal plane around the central cavity of the first drone.

15. A computer system for stabilizing a pair of drones performing a mid-air package transfer, the computer system comprising:
one or more computer processors;
one or more computer-readable storage media, and program instructions stored on the one or more computer-readable storage media, the program instructions comprising:
program instructions to detect that a first drone is located above, and vertically aligned with a second drone;
program instructions to determining detect an air pressure interference level of an area located between rotors of the first drone and rotors of the second drone, wherein the air pressure interference level is calculated based on a difference in air pressure between respective rotor intake areas of the rotors of first drone and the rotors of the second drone;
program instructions to adjust positions of the rotors of the first drone while maintaining an orientation of the rotors of the first drone, wherein the adjusting includes moving arms of the first drone to which the rotors of the first drone are attached in a first direction along a horizontal plane with respect to a central cavity of the first drone, wherein the arms of the first drone are moved in the first direction along the horizontal plane until the air pressure interference level of the area located between the rotors of the first drone and the rotors of the second drone is below a predetermined threshold; and
responsive to determining completion of a package transfer, program instructions to adjust the positions of the rotors of the first drone to respective original positions.

16. The computer system of claim 15, wherein an adjustment of the positions of the rotors of the first drone is performed by program instructions to activate telescopic arms attached to respective rotors of the first drone.

17. The computer system of claim 15, wherein program instructions to adjust the positions of the rotors of the first drone in the first direction includes program instructions for a telescopic movement of the arm attached to the respective rotors of the first drone.

18. The computer system of claim 15, further comprising:
program instructions to measure a change in the air pressure interference level of the rea located between the rotors of the first drone and the rotors of the second drone as the arms of the first drone move in the first direction along the horizontal plane with respect to the central cavity of the first drone; and
program instructions to determine positions of the rotors of the first drone and the rotors of the second drone that result in stabilized positions of the first drone and the second drone, based on a reduction of the air pressure interference level of the area located between the rotors of the first drone and the rotors of the second drone.

19. The computer system of claim 15, further comprising:
responsive to detecting an inadequate reduction of the air pressure interference level of the area located between the rotors of the first drone and the rotors of the second drone, program instructions to adjust positions of the rotors of the second drone while maintaining an orientation of the rotors of the second drone, wherein the adjusting includes moving arms of the second drone, to which rotors of the second drone are attached in a second direction along a horizontal plane with respect to a central cavity of the second drone, wherein the second direction increases a separation between the rotors of the first drone and the rotors of the second drone, and wherein an amount of the separation is based on a detection of an adequate reduction in the air pressure interference level of the area located between the rotors of the first drone and the rotors of the second drone to maintain stability.

20. The computer system of claim 15, wherein the program instructions to adjust positions of the rotors of the first drone further comprises:
adjusting the positions of the rotors of the first drone by a combination of movement of the arms in the first direction along the horizontal plane with respect to the central cavity of the first drone, and a rotation of the arms in the horizontal plane around the central cavity of the first drone.

\* \* \* \* \*